Patented Dec. 16, 1930

1,785,180

UNITED STATES PATENT OFFICE

HARRY P. CORSON, OF LAKEWOOD, OHIO, ASSIGNOR TO THE GRASSELLI CHEMICAL COMPANY, OF CLEVELAND, OHIO, A CORPORATION OF DELAWARE

FLUX FOR USE IN SOLDERING

No Drawing.  Application filed December 26, 1929.  Serial No. 416,754.

The present invention relates to processes of uniting metal articles by means of a solder in which a sulfonated vegetable oil compound is used as a flux.

I have found that sulfonated vegetable oils and their various salts, such as alkali-metal, including ammonium salts, particularly those which are water soluble have the properties required of an efficient flux, that is to say, they contribute to the dissolution of the oxide film on the metals to be united and render the molten solder capable of wetting, flowing and spreading over the metal pieces.

Sulfonated vegetable oil compounds are well known in the textile industry as Turkey red oils, and under such trade names as Para soaps, Monopole soaps, Monopole oils, etc. They are sufficiently stable at the temperatures used in common soft soldering operations to produce the beneficial effects expected of a practically non-corrosive flux.

Sulfonated corn oil, sulfonated cotton seed oil, sulfonated castor oil and their sodium and ammonium salts are among the commercially available products of this type which I have tested and found to have efficient fluxing properties. They are either applied as such, or in the form of their aqueous, alcoholic or other solutions. I have found that alcoholic solutions containing as little as about 10%, and aqueous solutions even down to 5% of a sulfonated vegetable oil have still valuable fluxing properties, though stronger solutions will usually be preferred if the full effect of the fluxing properties is desired.

My novel fluxes are used in substantially the same manner as common zinc chloride or rosin fluxes and can be used in the same mechanical soldering apparatus where solutions of zinc chloride or rosin are applicable.

Sulfonated vegetable oil compounds were found to be particularly useful in the soft soldering of tin plate, though on copper and zinc coated steel, etc., a fluxing action is also clearly present.

My novel fluxes have the advantage over zinc chloride fluxes that they are non-corrosive.

I claim:

1. In a process of soft soldering metals the step of applying a soldering flux comprising a sulfonated vegetable oil compound.

2. In a process of soft soldering tin plate the step of applying a soldering flux comprising a compound of the class consisting of sulfonated vegetable oils and their water soluble salts.

3. In a process of soft soldering tin plate the step of applying a soldering flux comprising an aqueous solution of a sulfonated vegetable oil compound.

In testimony whereof, I affix my signature.

HARRY P. CORSON.